(12) United States Patent
Ohbitsu

(10) Patent No.: US 8,704,954 B2
(45) Date of Patent: Apr. 22, 2014

(54) SIGNAL OUTPUT DEVICE AND SIGNAL OUTPUT METHOD

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 12/659,119

(22) Filed: Feb. 25, 2010

(65) Prior Publication Data

US 2010/0165190 A1 Jul. 1, 2010

Related U.S. Application Data

(63) Continuation of application No. PCT/JP2007/067049, filed on Aug. 31, 2007.

(51) Int. Cl.
| | |
|---|---|
| H04N 5/14 | (2006.01) |
| H04N 9/64 | (2006.01) |
| H04N 7/12 | (2006.01) |
| H04N 11/02 | (2006.01) |
| H04N 11/04 | (2006.01) |
| H04N 7/50 | (2006.01) |

(52) U.S. Cl.
USPC ............... 348/699; 375/240.16

(58) Field of Classification Search
USPC ............................................. 348/699
See application file for complete search history.

(56) References Cited

U.S. PATENT DOCUMENTS

| | | | |
|---|---|---|---|
| 6,600,835 B1 | 7/2003 | Ishikawa | |
| 2002/0157112 A1 | 10/2002 | Kuhn | |
| 2003/0169933 A1 | 9/2003 | Song et al. | |
| 2005/0078212 A1 | 4/2005 | Ha | |
| 2005/0249285 A1* | 11/2005 | Chen et al. | 375/240.16 |
| 2006/0210184 A1 | 9/2006 | Song et al. | |
| 2007/0067480 A1 | 3/2007 | Beek et al. | |
| 2008/0007614 A1 | 1/2008 | Mizuhashi et al. | |

FOREIGN PATENT DOCUMENTS

| | | |
|---|---|---|
| JP | 2000-232652 | 8/2000 |
| JP | 2002-44669 | 2/2002 |
| JP | 2003-274415 | 9/2003 |
| JP | 2003-527005 | 9/2003 |

(Continued)

OTHER PUBLICATIONS

International Preliminary Report on Patentability, mailed Mar. 18, 2010, in corresponding International Application No. PCT/JP2007/067049 (7 pp.).

(Continued)

*Primary Examiner* — Christopher S Kelley
*Assistant Examiner* — Hee-Yong Kim
(74) *Attorney, Agent, or Firm* — Staas & Halsey LLP

(57) ABSTRACT

A signal output device includes a signal output unit to output a video signal based on input image data, a storage unit to store the image data, a detection unit to detect whether or not the number of frames included in one set of image data stored in the storage unit satisfies a predetermined number, and a data creating unit to add, if the number of the frames included in the one set of image data does not satisfy the predetermined number, a new frame to the one set of image data so that the number of the frames included in the one set of image data satisfies the predetermined number, and to input, to the signal output unit, the one set of image data to which the new frame has been added.

12 Claims, 13 Drawing Sheets

(56) References Cited

FOREIGN PATENT DOCUMENTS

| | | |
|---|---|---|
| JP | 2005-124201 | 5/2005 |
| JP | 2006-165602 | 6/2006 |
| JP | 2007-89137 | 4/2007 |
| WO | 2007/035705 A2 | 3/2007 |

OTHER PUBLICATIONS

International Search Report for PCT/JP2007/067049, mailed Dec. 4, 2007.

Chinese Office Action mailed Dec. 31, 2011 issued in corresponding Chinese Patent Application No. 200780100388.0.

* cited by examiner

SIGNAL OUTPUT DEVICE AND SIGNAL OUTPUT METHOD

CROSS-REFERENCE TO RELATED APPLICATIONS

This is a continuation of Application PCT/JP2007/067049, filed on Aug. 31, 2007, now pending, the contents of which are herein wholly incorporated by reference.

FIELD

The embodiment relates to a signal output device and a signal output method.

BACKGROUND

As a frame rate conversion method, there is a method of adding a frame between adjacent frames (see Patent document 1). Further, for interpolation of a video frame, there is a 2-3 pulldown scheme for converting a 24-frame video of a video film into an interlaced signal exhibiting 60 fields per second. Then, in order to smooth the motion of an image, there is a method of determining a movement amount from a pixel difference and applying the movement amount to the interpolation according to the 2-3 pulldown scheme (see Patent document 2).

[Patent document 1] Japanese Laid-open Patent Publication No. 2005-124201
[Patent document 2] Japanese Laid-open Patent Publication No. 2006-165602

SUMMARY

Up to now, by using a personal computer to which a tuner and an antenna capable of receiving a one-segment broadcast (1seg broadcast) are connected, it is possible to view the 1seg broadcast. In this case, video frames transmitted from a broadcasting station are displayed as they are.

The 1seg broadcast represents a broadcast for portable/mobile units which is provided by using one segment of 13 segments that are obtained by dividing a band (6 MHz) per channel of a digital terrestrial television broadcast. Provided by the 1seg broadcast are not only television programs but also contents including text data and still image data.

In the 1seg broadcast, H.264/AVC (level 1.2, 320×240 or 320×180, minimum frame interval $1/15$ seconds) is used as a compression coding scheme for moving image data. Therefore, the video is displayed at maximum 15 frames/second, and this value is a maximum value. A video format of video data (image data) transmitted from the broadcasting station depends on the television program at the broadcasting station. For that reason, there is a case where the video data is broadcast from the broadcasting station at 12 frames/second.

There is a difference in quality of an appearance of the displayed video between the case where the video data is broadcast at 15 frames/second and the case where the video data is broadcast at 12 frames/second. For that reason, when the channel is switched over, the quality of the appearance may differ between the video before the switching and the video after the switching. Further, there may be a difference between the quality of the appearances of the videos broadcast from even the same broadcasting station.

A signal output device according to one aspect of the embodiment includes: the embodiment provides a signal output device, including: a signal output unit to output a video signal based on input image data; a storage unit to store the image data; a detection unit to detect whether or not a number of frames included in one set of image data stored in the storage unit satisfies a predetermined number; and a data creating unit to add, if the number of the frames included in the one set of image data does not satisfy the predetermined number, a new frame to the one set of image data so that the number of the frames included in the one set of image data satisfies the predetermined number, and to input, to the signal output unit, the one set of image data to which the new frame has been added.

The object and advantages of the embodiment will be realized and attained by means of the elements and combinations particularly pointed out in the claims. It is to be understood that both the foregoing general description and the following detailed description are exemplary and explanatory and are not restrictive of the embodiment, as claimed.

DESCRIPTION OF EMBODIMENTS

Figure 1:
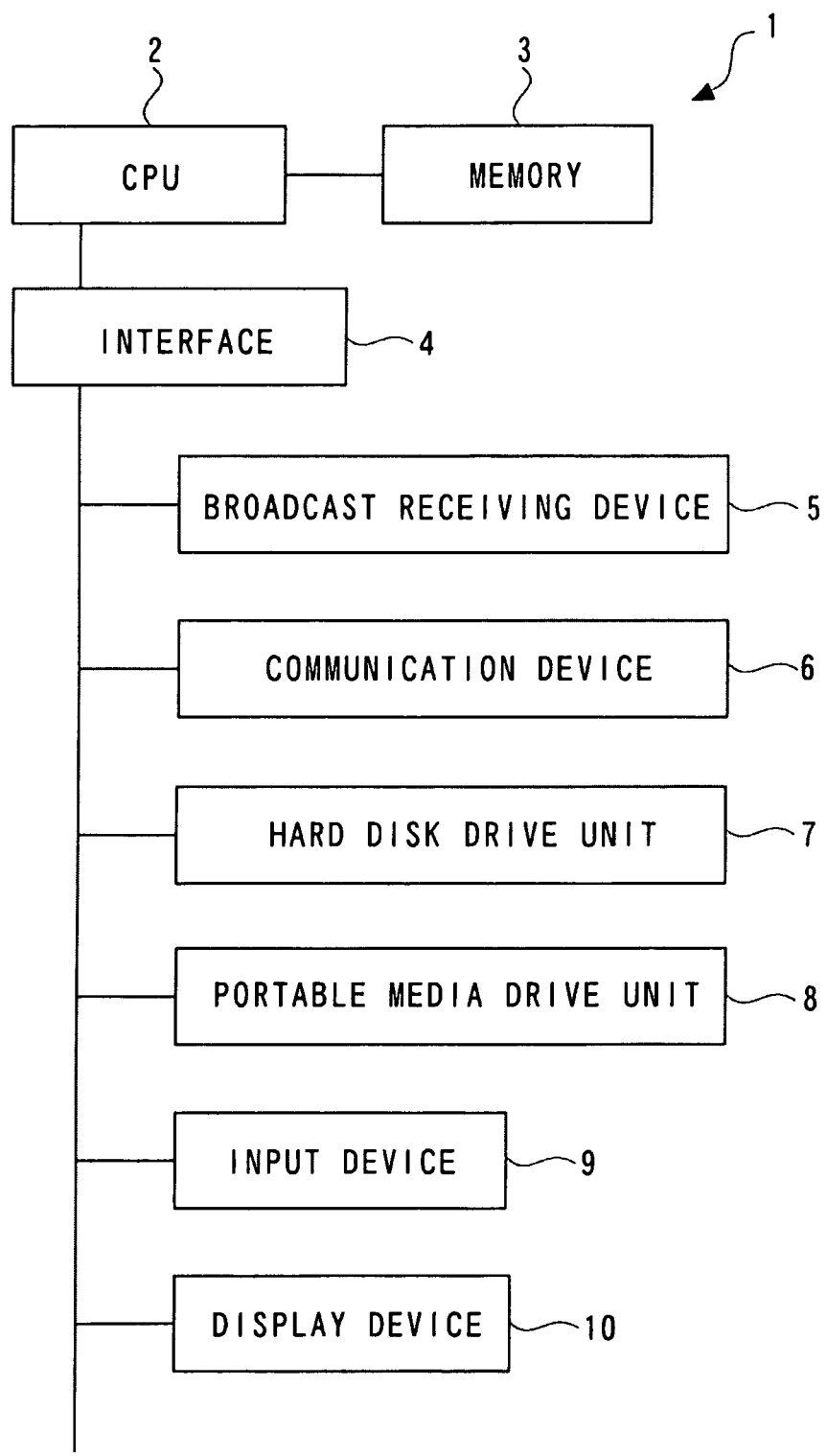
FIG. 1 is a hardware configuration diagram of a personal computer according to an embodiment.

According to the embodiment, a new frame is interpolated so that the number of frames included in one set of image data satisfies the predetermined number. Then, the video signal is output based on the one set of image data to which the new frame has been added, thereby making it possible to output such a video signal as to prevent the viewer from feeling uncomfortable. That is, by interpolating a new frame into one set of image data, it becomes possible to output the video signal maintaining constant quality.

Further, in the signal output device, the data creating unit may divide each of the frames into a plurality of local regions, calculate movement amount of each of the local regions within the continuous frames, detect 2 frames exhibiting the largest movement amount of the local region, and add the new frame between the 2 frames.

By the data creating unit dividing each of the frames included in one set of image data into the plurality of local regions, it becomes possible to calculate the movement amount of the local region between the continuous frames.

Then, by the data creating unit detecting the 2 frames exhibiting the largest movement amount of the local region, it becomes possible to add a new frame to a video portion that causes the viewer to feel uncomfortable.

Further, in the signal output device, the new frame may be created based on one frame of the 2 frames and the frame that is different from the 2 frames and is adjacent to the one frame. The expression "one frame of the 2 frames and the frame that is different from the 2 frames and is adjacent to the one frame" represents the continuous frames. By referencing the continuous frames, a new frame can be interpolated into one set of image data having continuous frames that are missing, which makes it possible to provide the video maintaining constant quality.

Further, in the signal output device, the new frame may be created based on the movement amount and a movement direction between the local region within one frame of the 2 frames and the local region within the frame that is different from the 2 frames and is adjacent to the one frame. The expression "one frame of the 2 frames and the frame that is different from the 2 frames and is adjacent to the one frame" represents the continuous frames. It is possible to interpolate a new frame into one set of image data having continuous frames that are missing based on the movement amount and the movement direction of the local region within the continuous frames, which makes it possible to provide the video maintaining constant quality.

Further, in the signal output device, it is preferred that the image data includes a moving image; and the frame included in the one set of image data be set as a minimum unit structure that forms the moving image.

Further, the embodiment may provide a method of causing a computer or other such device, machine, or the like to execute any one of the above-mentioned processing. Further, the embodiment may provide a program for causing a computer or other such device, machine, or the like to execute any one of the above-mentioned processing. Further, the embodiment may provide a computer-readable recording medium having such a program recorded thereon.

Hereinafter, with reference to the drawings, an information equipment provided with an signal output device according to the embodiment is described as a personal computer having a function of allowing viewing of a 1seg broadcast.

A configuration of the embodiment described below is a mere example.

The personal computer according to the embodiment is a personal computer that includes a tuner for receiving a 1seg broadcast and decoder means, and allows viewing of a 1seg broadcast by displaying a video based on the video signal obtained by decoding on a display device (display) and reproducing an audio based on an audio signal obtained by decoding.

In the 1seg broadcast, due to a difference in the broadcast program or the broadcasting station, there is a case where video data (image data) is broadcast at 15 frames/second or a case where the video data is broadcast at 12 frames/second. In comparison with the case where video data is broadcast at 15 frames/second, in the case where the video data is broadcast at 12 frames/second, the video data is received in a state in which 3 frames are missing.

Therefore, the embodiment allows a video maintaining constant quality to be displayed by adding dummy frames for the 3 missing frames even in the case where video data is broadcast at 12 frames/second.

FIG. 1 is a hardware configuration diagram of a personal computer 1 according to the embodiment. As illustrated in FIG. 1, the personal computer 1 includes a CPU 2 that executes a computer program to control the personal computer 1, a memory 3 that stores the computer program executed by the CPU 2 and data processed by the CPU 2, an interface 4 that connects the CPU 2 to each kinds of devices, and the devices connected through the interface 4 including a broadcast receiving device 5, a communication device 6, a hard disk drive unit 7, a portable media drive unit 8, an input device 9, and a display device 10.

The memory 3 stores data executed by the CPU 2 and program processed by the CPU 2. The memory 3 includes a volatile random access memory (RAM) and a nonvolatile read only memory (ROM). The ROM includes a rewritable semiconductor memory such as a flash memory, an erasable programmable read-only memory (EPROM), and an electrically erasable programmable read-only memory (EEPROM).

The interface 4 may be any one of a serial interface such as universal serial bus (USB), and a parallel interface such as peripheral component interconnect (PCI), industry standard architecture (ISA), extended ISA (EISA), AT Attachment (ATA), integrated drive electronics (IDE), IEEE1394, and small computer system interface (SCSI). Note that the CPU 2 is connected to each of the devices by the interface 4, but the CPU 2 may be connected to each of the devices by a different interface. Further, a plurality of interfaces may be bridge-connected.

The broadcast receiving device 5 includes an antenna, a tuner, and a demodulator, and is controlled by the CPU 2 that executes a device driver. The broadcast receiving device 5 uses the antenna to receive a broadcast wave, and uses the tuner to select a channel. Then, the broadcast receiving device 5 performs an orthogonal frequency division multiplexing (OFDM) demodulation processing based on the broadcast wave on the channel by using the demodulator and a creation processing (decoding processing) for compressed moving image data stream (TS data). The created TS data is output via a bus. The TS data is temporarily stored in the memory 3. Then, the TS data stored in the memory 3 is converted into a video signal, and output to the display device 10.

The communication device 6 is an interface to a broadband network. Examples of the broadband network include wired networks such as a local area network (LAN), a cable television network, an x digital subscriber line (xDSL), an ADSL, and an optical network and networks allowing wireless access such as a wireless LAN and a fixed wireless access (FWA). The communication device 6 acquires, for example, a computer program installed on the hard disk drive unit 7, an electronic program guide for a television broadcast from a server on the network, and the like. Those broadband networks can be generally connected to the Internet.

The hard disk drive unit 7 stores a program to be loaded in the memory 3. Further, the hard disk drive unit 7 stores data to be processed by the CPU 2.

The portable media drive unit 8 is, for example, a drive unit for a compact disc (CD), a digital versatile disk (DVD), an HD-DVD, a Blu-ray disc, and the like. Further, the portable media drive unit 8 may be an input/output device for a card medium having a nonvolatile memory such as a flash memory. A medium driven by the portable media drive unit 8 retains the computer program installed on the hard disk drive unit 7, input data, and the like. Examples of the input device 9 include a keyboard, a mouse, a pointing device, and a wireless remote control.

The display device 10 displays a video based on a video signal. The video is displayed on the display device 10 to thereby allow the user to view the television broadcast. Examples of the display device 10 include a liquid crystal display device, a plasma display panel, a cathode ray tube (CRT), and an electroluminescence panel. Further, the display device 10 is attached with a speaker, which outputs an audio based on the audio signal.

The information equipment provided with the signal output device according to the embodiment can be configured as the personal computer 1 as described above. However, the information equipment provided with the signal output device according to the embodiment is not limited to the personal computer 1, and may be another device having a function equivalent thereto such as a television receiver. Further, the information equipment can be realized by a tuner for receiving a television broadcast, a set-top box, a mobile telephone with a television broadcast receiving function, a mobile information terminal (PDA), a game machine, an in-vehicle device with a television broadcast receiving function, and the like.

Figure 2:
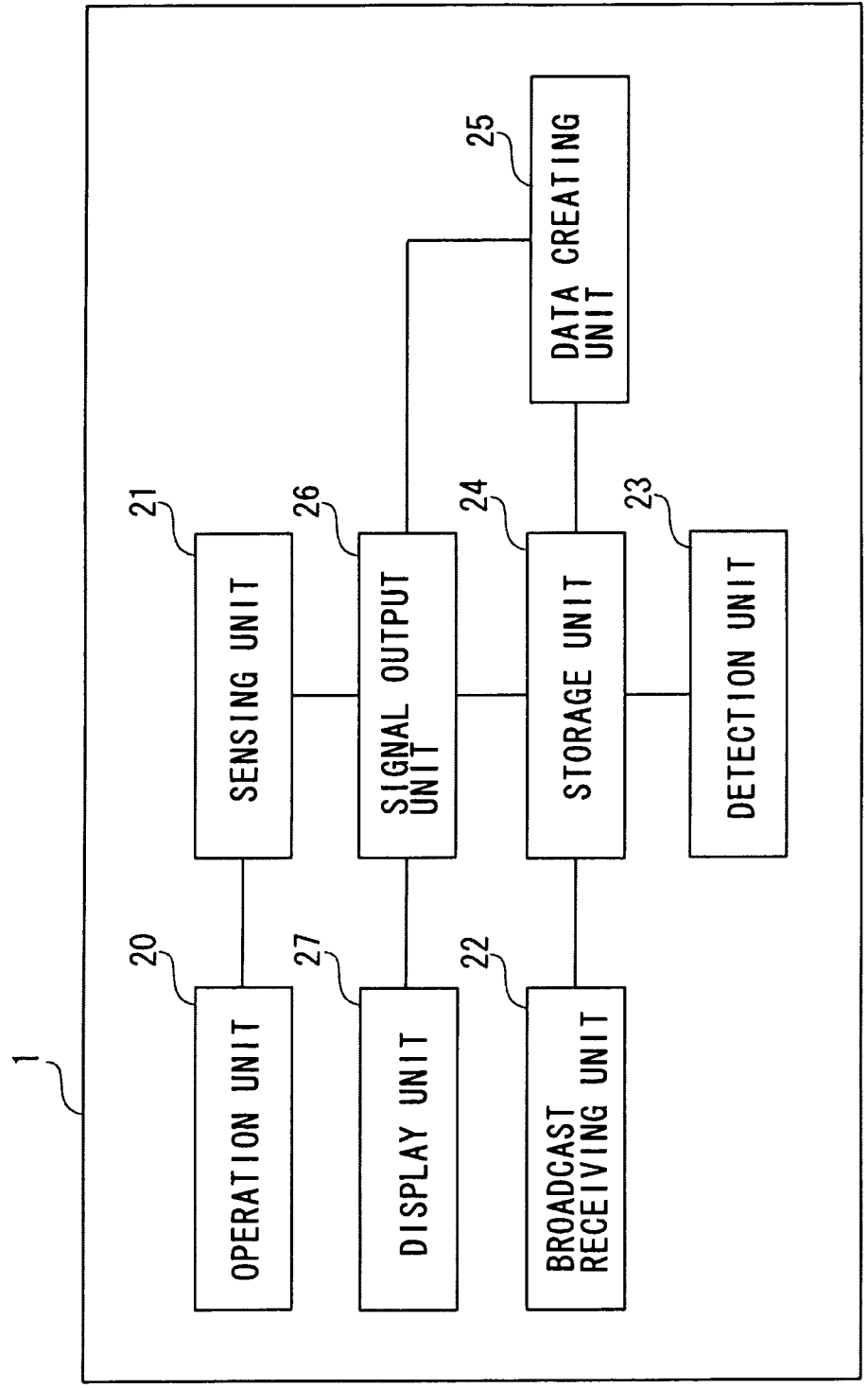
FIG. 2 is a functional configuration diagram of the personal computer according to the embodiment.

FIG. 2 is a functional configuration diagram of the personal computer 1 according to the embodiment. The personal computer 1 includes an operation unit 20 that operates the personal computer in response to a user's operation, a sensing unit 21 that senses an operation performed on the operation unit 20, a broadcast receiving unit 22 that receives a broadcast wave (television broadcast) and decodes data on the received broadcast wave into TS data, a detection unit 23 that detects whether or not the TS data output from the broadcast receiving unit 22 needs interpolation, a storage unit 24 that temporarily stores the TS data output from the broadcast receiving unit 22, a data creating unit 25 that creates new TS data based on the TS data stored in the storage unit 24, a signal output unit 26 that converts the TS data output from the storage unit 24 and the TS data output from the data creating unit 25 into a video signal and inputs the video signal to a display unit 27, and the display unit 27 that displays a video based on the input video signal.

The operation unit 20, the sensor unit 21, the broadcast receiving unit 22, the detection unit 23, the storage unit 24, the data creating unit 25, the signal output unit 26 and the display unit 27 can be realized by a computer including the CPU 2 and the memory 3, the respective devices, programs executed on the computers, and the like.

The operation unit 20 is operated in a case where an input is received from the user and a predetermined command and necessary data are input and other such case.

The sensing unit 21 senses an operation performed on the operation unit 20 (for example, a start operation for viewing a broadcast program or a switch operation for a receiving channel). The sensing unit 21 may be configured as a computer program executed on the CPU 2. Further, dedicated hardware may be provided as the sensing unit 21.

The broadcast receiving unit 22 receives the broadcast wave through the antenna, and outputs the data stream (for example, TS data) based on the received broadcast wave. The broadcast receiving unit 22 may be configured as a computer program executed on the broadcast receiving device 5 or the CPU 2.

Figure 3:
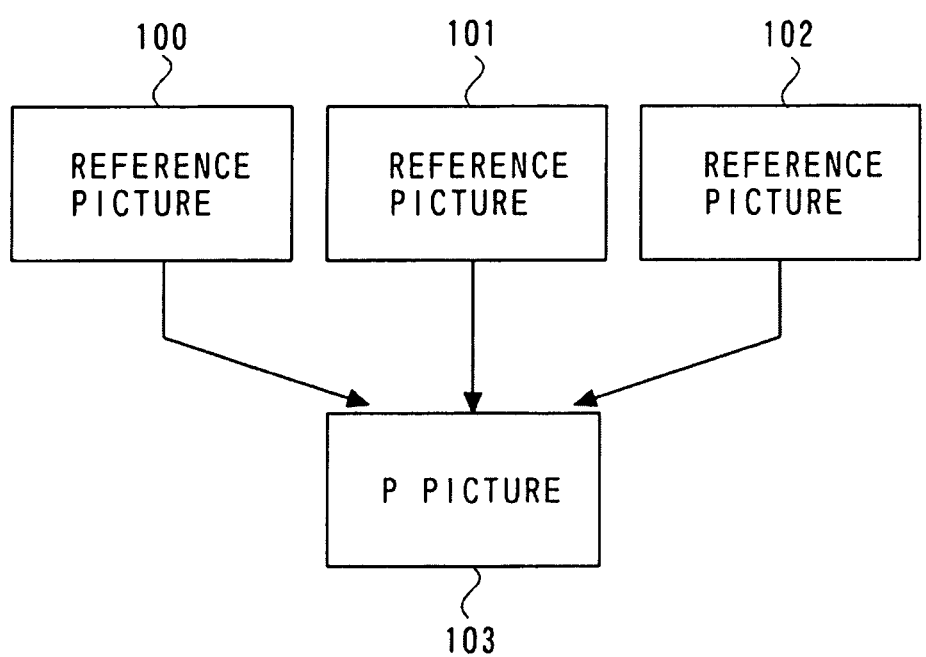
FIG. 3 is an explanatory diagram of inter-frame prediction processing of H.264/AVC.

The detection unit 23 monitors the TS data output from the broadcast receiving unit 22, and detects which of 12 frames and 15 frames a GOP of the TS data has. In the H.264/AVC, as illustrated in FIG. 3, inter-frame prediction processing is performed within 3 or less reference pictures (100, 101, and 102), and a predictive picture (P picture) 103 is created. In the embodiment, the P picture 103 illustrated in FIG. 3 is called "picture" or "frame". In the embodiment, the TS data that is video data may be a moving image, and a frame included in the GOP of the TS data may be set as a minimum unit structure that forms a moving image. Further, a group of a set of frames separated by an IDR picture is called "group of pictures (GOP)". In the embodiment, there is a case where the GOP has 12 frames and a case where the GOP has 15 frames. Further, in the embodiment, a reproduction duration of one GOP is one second. The detection unit 23 may be configured as a computer program executed on the CPU 2.

The storage unit 24 temporarily stores the input data. The storage unit 24 receives an input of the TS data output from the broadcast receiving unit 22, and stores the TS data that is 3 seconds long in terms of the reproduction duration. The TS data stored in the storage unit 24 is input to the data creating unit 25 or the signal output unit 26. The storage unit 24 is configured as a recording medium controlled by the computer program executed on the CPU 2, the recording medium including a volatile memory, a nonvolatile memory such as a flash memory, a hard disk, and a portable medium. Further, the storage unit 24 may be configured as a memory dedicated to store the input data.

The data creating unit 25 counts the number of frames included in the GOP separated by the IDR picture to thereby judge which of 12 frames and 15 frames the GOP of the TS data stored in the storage unit 24 has. If the GOP of the TS data stored in the storage unit 24 has 12 frames, the data creating unit 25 adds 3 frames to the GOP of the TS data (frame interpolation), and outputs the TS data having 15 frames of the GOP to the signal output unit 26. The data creating unit 25 may be configured as a computer program executed on the CPU 2.

The signal output unit 26 includes an interface to the display unit 27, and controls the TS data to be output to the display unit 27. That is, the signal output unit 26 converts the TS data input from the storage unit 24 or the data creating unit 25 into the video signal that can be displayed by the display unit 27 or the audio signal, and outputs the video signal or the audio signal to the display unit 27. Further, the signal output unit 26 receives an input of the TS data delayed by 3 seconds after a time when the broadcast wave is received by the broadcast receiving unit 22. The signal output unit 26 may be configured as a computer program executed on the CPU 2. Further, the signal output unit 26 may be configured as a processor dedicated to output the video signal and the audio signal.

Upon reception of the input of the video signal and the audio signal output from the signal output unit 26, the display unit 27 displays the video and reproduces the audio. Further, the display unit 27 receives an input of the video signal and the audio signal delayed by 3 seconds after a time when the broadcast wave is received by the broadcast receiving unit 22.

In the embodiment, an amount of the stored TS data corresponds to 3 seconds in terms of the time required for reproduction thereof as the moving image or the audio. For example, the moving image data has 12 frames or 15 frames per second in the 1seg broadcast, and hence the moving image data having approximately 36 frames to 45 frames is stored. The storage amount may preferably be set to be as large as possible, but is set to 3 seconds in the embodiment in consideration of a size of the storage area that can be secured on the personal computer 1. However, the storage amount may preferably be set to an optimum value appropriately for each embodiment. For example, a capacity of a main memory that can be secured may be increased by terminating a resident application or an unnecessary application or by not using a part of the main memory as a video memory (by providing a separate video memory), thereby increasing the storage amount.

Further, the personal computer 1 according to the embodiment performs an output of the TS data delayed by 3 seconds. In other words, in a case where the 1seg broadcast is viewed on the personal computer 1 according to the embodiment, the video and the audio are output with a delay by approximately 3 seconds in comparison with a case of viewing on another general 1seg broadcast viewing device. By performing the delayed output, even if the video data having a small number of frames is received, instead of outputting the video signal having a small number of frames as they are, it becomes possible to interpolate a video corresponding to a portion of the lacking number of frames by reproducing the stored data that has not been output with a delay.

<Processing Flow>

Figure 4:
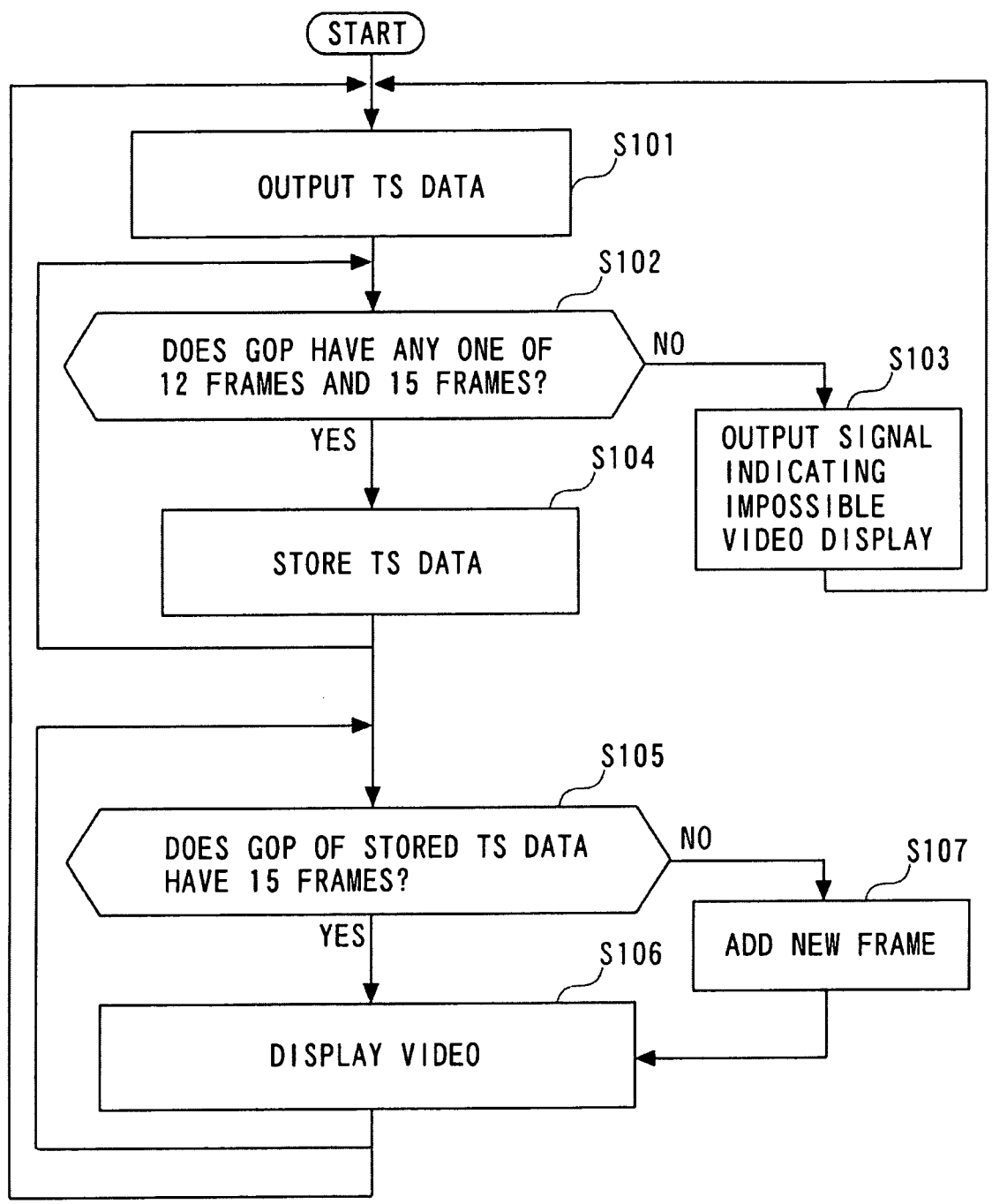
FIG. 4 is a diagram illustrating a signal output processing according to the embodiment.
Figure 5:
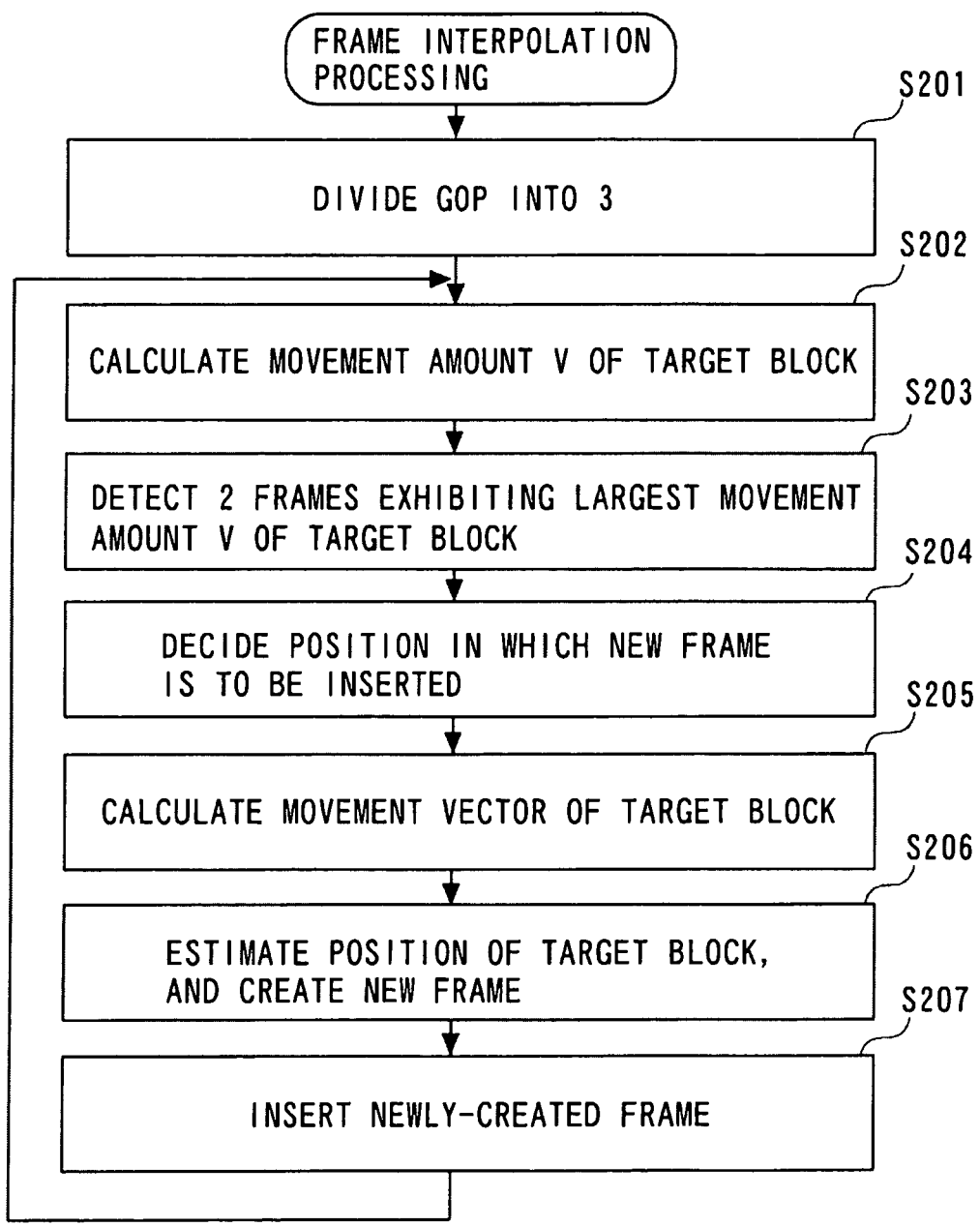
FIG. 5 is a diagram illustrating a frame interpolation processing according to the embodiment.

FIG. 4 and FIG. 5 illustrate a processing flow for the personal computer 1. FIG. 4 is a flowchart illustrating a signal output processing according to the embodiment. FIG. 5 is a flowchart illustrating a frame interpolation processing according to the embodiment.

<Signal Output Processing>

Description is made of the signal output processing of FIG. 4. The signal output processing according to the embodiment is executed by the sensing unit 21 detecting a television viewing start operation performed on the operation unit 20 and by a signal of an instruction to start the signal output processing being output from the sensing unit 21 to the signal output unit 26.

First, the TS data is output from the broadcast receiving unit 22 (Step S101). Subsequently, the detection unit 23 that has received the TS data output from the broadcast receiving unit 22 judges whether or not the GOP of the TS data has any one of 12 frames and 15 frames (Step S102).

If the GOP of the TS data has none of 12 frames and 15 frames (NO in the processing of Step S102), the detection unit 23 outputs a signal indicating impossible video display to the signal output unit 26 (Step S103). The signal output unit 26 to which the signal indicating impossible video display has been input outputs the video signal including a message indicating that normal display cannot be performed to the display unit 27. The display unit 27 to which the video signal including the message indicating that normal display cannot be performed has been input displays the message indicating that normal display cannot be performed. For example, the display unit 27 performs display of "No signal". This allows a viewer to grasp a situation in which the viewing is made impossible due to some factor. If the detection unit 23 outputs the signal indicating impossible video display to the signal output unit 26, the procedure advances to the processing of Step S101.

Meanwhile, if the GOP of the TS data has one of 12 frames and 15 frames (YES in the processing of Step S102), the TS data is stored into the storage unit 24 (Step S104). If the TS data corresponding to 3 seconds is stored into the storage unit 24, the procedure advances to the processing of Step S105.

Subsequently, the data creating unit 25 judges whether or not the GOP of the TS data stored in the storage unit 24 has 15 frames (Step S105). That is, the data creating unit 25 judges whether or not the number of frames included in the GOP stored in the storage unit 24 is 15.

If the GOP of the TS data has 15 frames (YES in the processing of Step S105), the TS data is input from the storage unit 24 to the signal output unit 26. Then, by the signal output unit 26, the TS data is converted into a video signal and input to the display unit 27. The display unit 27 displays the video according to the video signal input from the signal output unit 26 (Step S106).

Meanwhile, if the GOP of the TS data does not have 15 frames (NO in the processing of Step S105), the data creating unit 25 adds new frames to thereby create the TS data in which the number of frames included in the GOP is 15 frames (Step S107). The data creating unit 25 outputs the TS data in which the number of frames included in the GOP is 15 frames to the signal output unit 26. The TS data input to the signal output unit 26 is converted into the video signal and input to the display unit 27. The display unit 27 displays the video according to the video signal input from the signal output unit 26 (Step S106). If the TS data corresponding to 3 seconds stored in the storage unit 24 is processed, the procedure advances to the processing of Step S101.

<Frame Interpolation Processing>

Next, description is made of a new-frame addition processing (frame interpolation processing) performed by the data creating unit 25 in Step S107 of FIG. 4. FIG. 5 is a flowchart illustrating the frame interpolation processing performed by the data creating unit 25.

The data creating unit 25 divides the TS data in which the number of frames included in the GOP is not 15 frames among the TS data which is stored in the storage unit 24 (Step S201). That is, the data creating unit 25 divides the TS data in which the number of frames included in the GOP is 12 frames among the TS data which is stored in the storage unit 24. In this case, the data creating unit 25 divides 12 frames into 3 frame groups to thereby create 3 suites of 4-frame group.

Figure 6:
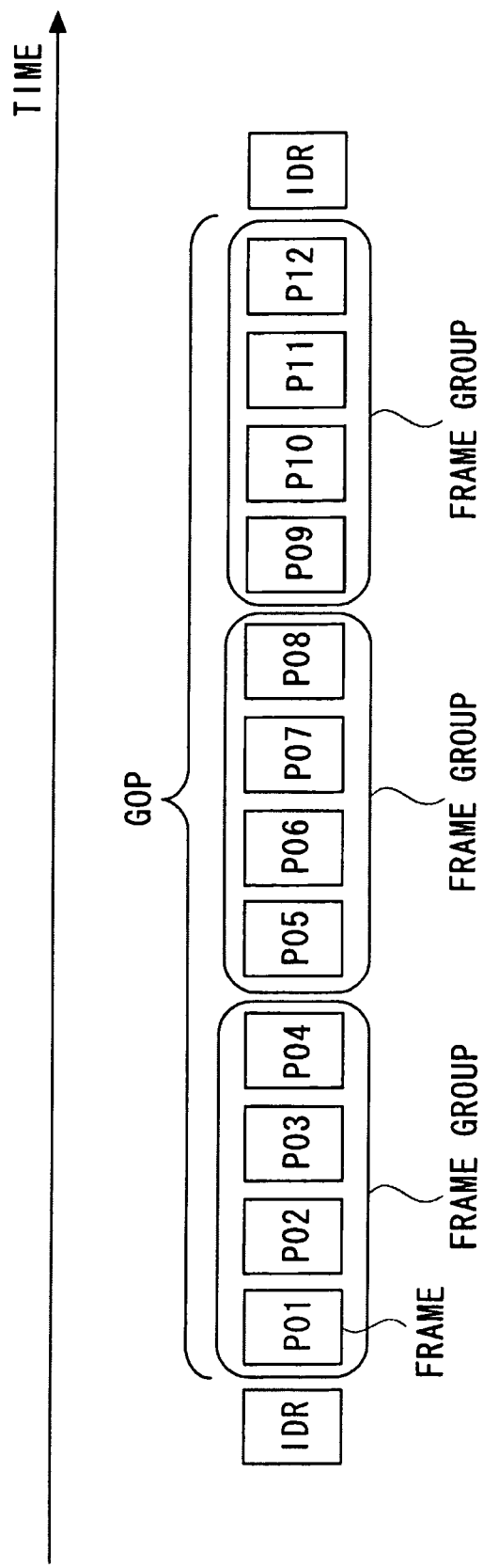
FIG. 6 is an explanatory diagram of a GOP according to the embodiment.

FIG. 6 is an explanatory diagram of the GOP in a case where 12 frames are divided into the 3 frame groups. A frame P01 is a frame that displays the past video temporally preceding a frame P02. By being separated by the IDR picture, 12 frames from the frame P01 to the frame P12 form the GOP.

In the embodiment, an example of creating 3 suites of 4-frame group is illustrated, but the embodiment is not limited thereto, and the number of frames included in the frame group may be appropriately changed. For example, four suites of 3-frame group, or 2 suites of 6-frame group may be created. Further, the TS data corresponding to 3 seconds is stored in the storage unit 24, and hence the suite of frame group may be created from a frame included in a different GOP. For example, the suite of frame group may be created from the frame P01, the frame P02, and the frame P03 of FIG. 6 and the frame included in the GOP of the TS data which displays the past video temporally preceding the GOP illustrated in FIG. 6.

Figure 7:
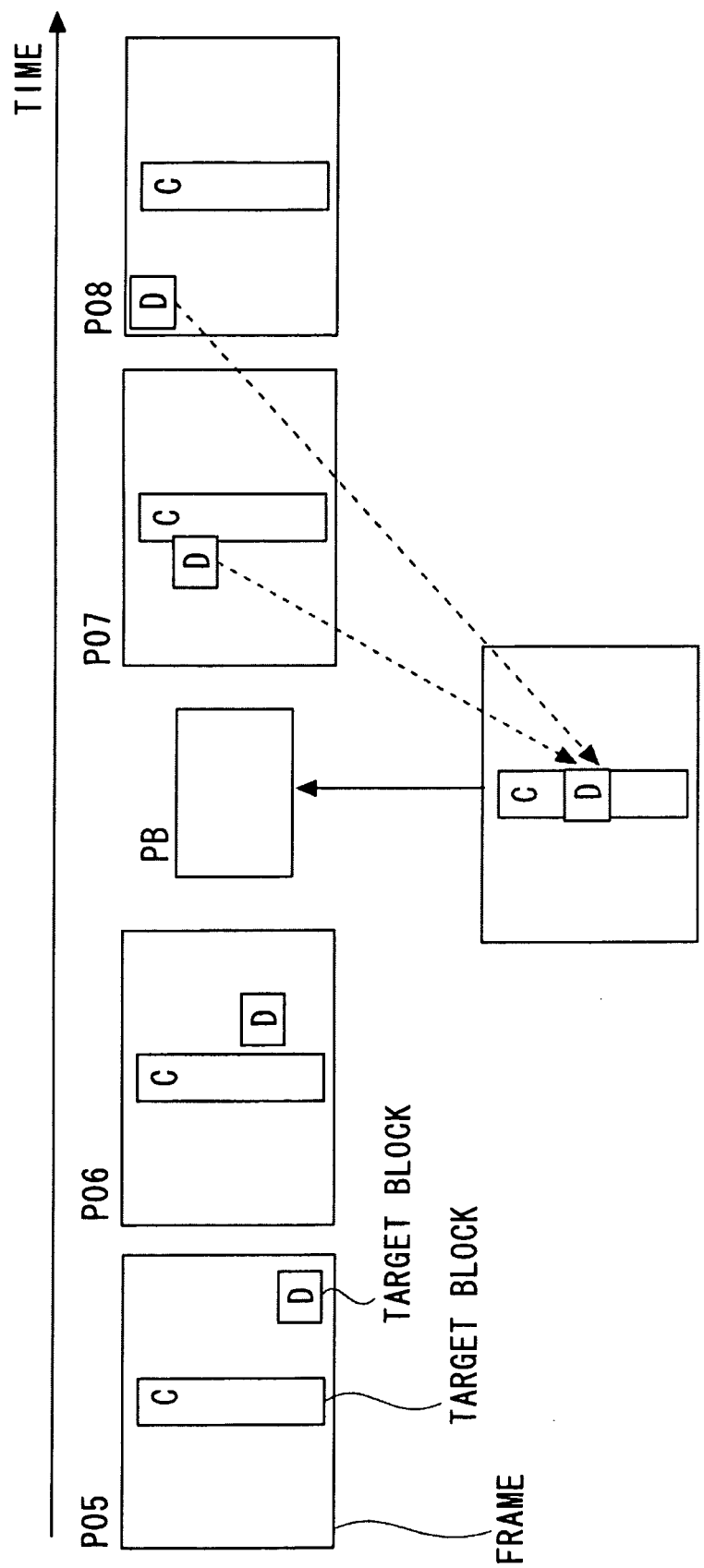
FIG. 7 is a diagram illustrating an example of the frame interpolation processing according to the embodiment.

Next, returning to the description of FIG. 5, the data creating unit 25 calculates a movement amount V of a target block by referencing respective frames stored in the storage unit 24 (Step S202). Here, with reference to FIG. 7, the movement amount V of the target block is described. The frame P05, the frame P06, the frame P07, and the frame P08 of FIG. 7 represent the frames (TS data) stored in the storage unit 24. Here, the frames stored in the storage unit 24 are output from the storage unit 24 in order of the frame P05, the frame P06, the frame P07, and the frame P08.

In the embodiment, the frame is divided into macro blocks (corresponding to "local regions"), and the movement amounts of the macro blocks are calculated. In the frame P05, the frame P06, the frame P07, and the frame P08 of FIG. 7, the target blocks (macro blocks) are denoted by reference symbols C and D.

The data creating unit 25 references the respective frames stored in the storage unit 24 to detect a movement of the target block by detecting a fluctuation amount of a color difference signal in the target block. Then, the data creating unit 25 calculates the movement amount V of the target block from which the movement has been detected. That is, the frames are continuously stored in the storage unit 24, and hence the data creating unit 25 compares the continuous frames with each other, and calculates the movement amount V of the target block common to the 2 frames.

If the frame P07 and the frame P08 illustrated in FIG. 7 are compared with each other, only the target block D exhibits the fluctuation amount of the color difference signal, and hence the movement of the target block D is detected. Further, if the frame P07 and the frame P08 illustrated in FIG. 7 are compared with each other, the target block C does not exhibit the fluctuation amount of the color difference signal, and hence the movement of the target block C is not detected.

Note that if the movements of a plurality of target blocks are detected in the processing of Step S202 in FIG. 5, the data creating unit 25 may calculate the movement amount V of the target block with regard to the target block exhibiting the largest movement amount among the detected target blocks. This is because the viewer's attention is likely to be focused on a portion exhibiting a large change within the video. Further, if the movements of a plurality of target blocks are detected in the processing of Step S202, the data creating unit 25 may calculate a mean value of the movement amounts of the detected plurality of target blocks as the movement amount V of the target block.

Figure 8:
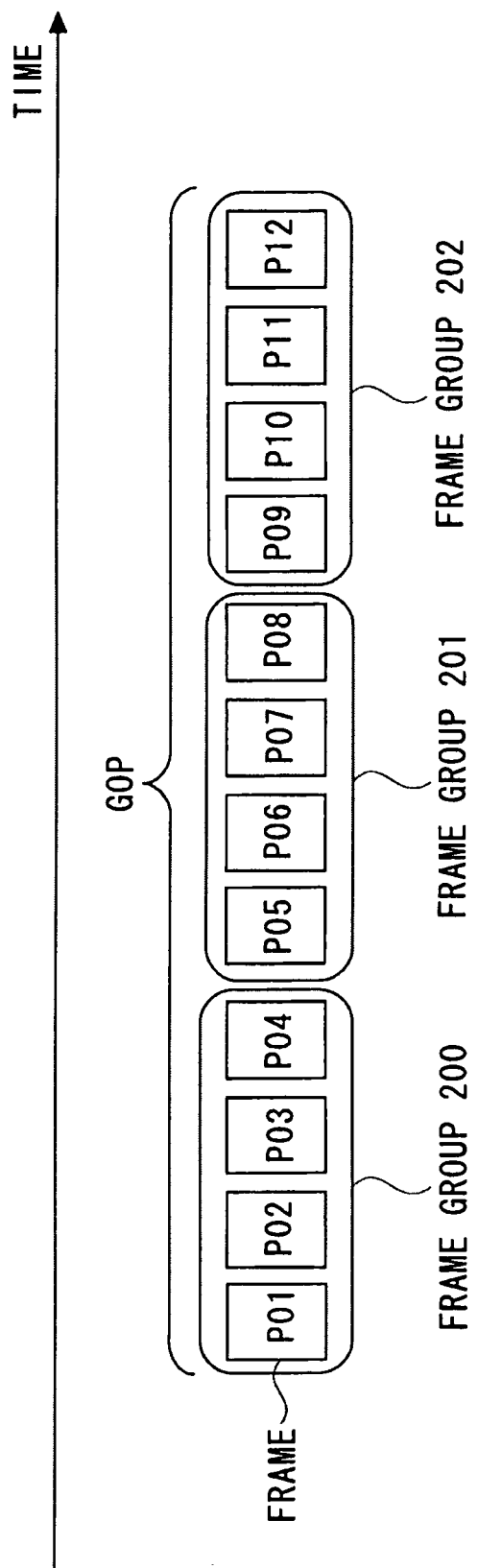
FIG. 8 is an explanatory diagram of the GOP according to the embodiment.

Returning to the description of FIG. 5, the data creating unit 25 references the respective frames stored in the storage unit 24 to detect 2 frames exhibiting the largest movement amount V of the target block (Step S203). Here, detailed description is made of a processing for detecting the 2 frames exhibiting the largest movement amount V of the target block. FIG. 8 is an explanatory diagram of the GOP. FIG. 8 illustrates one GOP, in which 12 frames are divided into a frame group 200, a frame group 201, and a frame group 202. If the 2 frames exhibiting the largest movement amount V of the target block are detected from the frame group 201, the data creating unit 25 references the frame P04, the frame P05, the frame P06, the frame P07, the frame P08, and the frame P09. Therefore, the data creating unit 25 references the frames within the frame group and the frames continuous to the frames within the frame group (in FIG. 8, the frame P04 and the frame P09) to thereby detect the 2 frames exhibiting the largest movement amount V of the target block.

Returning to the description of FIG. 5, the data creating unit 25 decides a position in which a new frame is to be inserted (Step S204). Specifically, the data creating unit 25 decides to insert a new frame between the 2 frames detected in the processing of Step S203.

Subsequently, the data creating unit 25 references 2 any frames stored in the storage unit 24 to calculate a movement vector (movement amount and movement direction) of the target block (Step S205). For example, one of the 2 frames detected in the processing of Step S203 and the frame continuous to the one frame may be referenced to calculate the movement vector of the target block. In FIG. 7, the frame P07 and the frame P08 are referenced to calculate the movement vectors of the target block C and the target block D. Further, the frame P05 and the frame P06 may be referenced to calculate the movement vectors of the target block C and the target block D.

Returning to the description of FIG. 5, the data creating unit 25 estimates the position of the target block from the calculated movement vector and creates a new frame (Step S206). In FIG. 7, the positions of the target block C and the target block D are estimated from the movement vectors of the target block C and the target block D, and a new frame PB is created.

Figure 9:
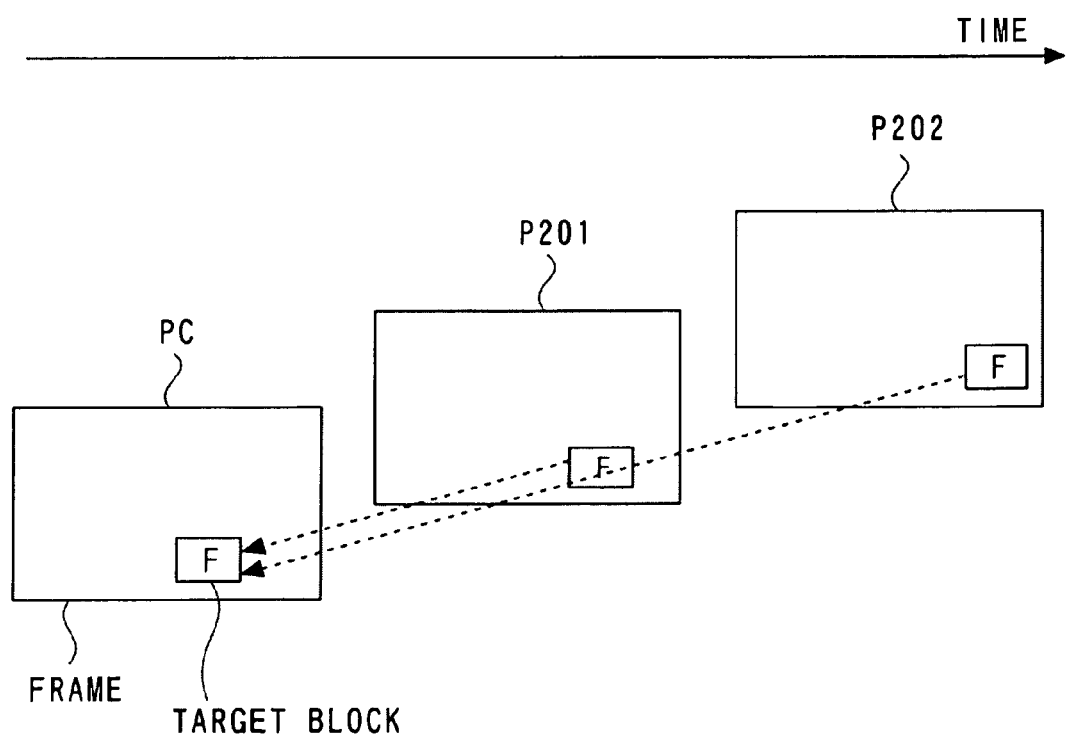
FIG. 9 is an explanatory diagram of bi-prediction processing of H.264/AVC.

Here, with reference to FIG. 9, description is made of creation of the new frame by bi-prediction processing of H.264/AVC. In the bi-prediction processing of H.264/AVC, 2 any frames are referenced to create a new frame. In FIG. 9, the target block F within the frame P201 and the target block F within the frame P202 are referenced to create the target block F within a new frame PC. The frame P201 and the frame P202 represent a video displayed temporally after the new frame PC. The new frame PB illustrated in FIG. 7 is created by the above-mentioned processing illustrated in FIG. 9.

Returning to the description of FIG. 5, the data creating unit 25 inserts the newly-created frame in the position decided in the processing of Step S204 (Step S207). The data creating unit 25 repeatedly performs the processing from Step S202 to Step S207 on each of the 3 frame groups obtained by the dividing, and the frame interpolation processing is brought to an end.

Figure 10:
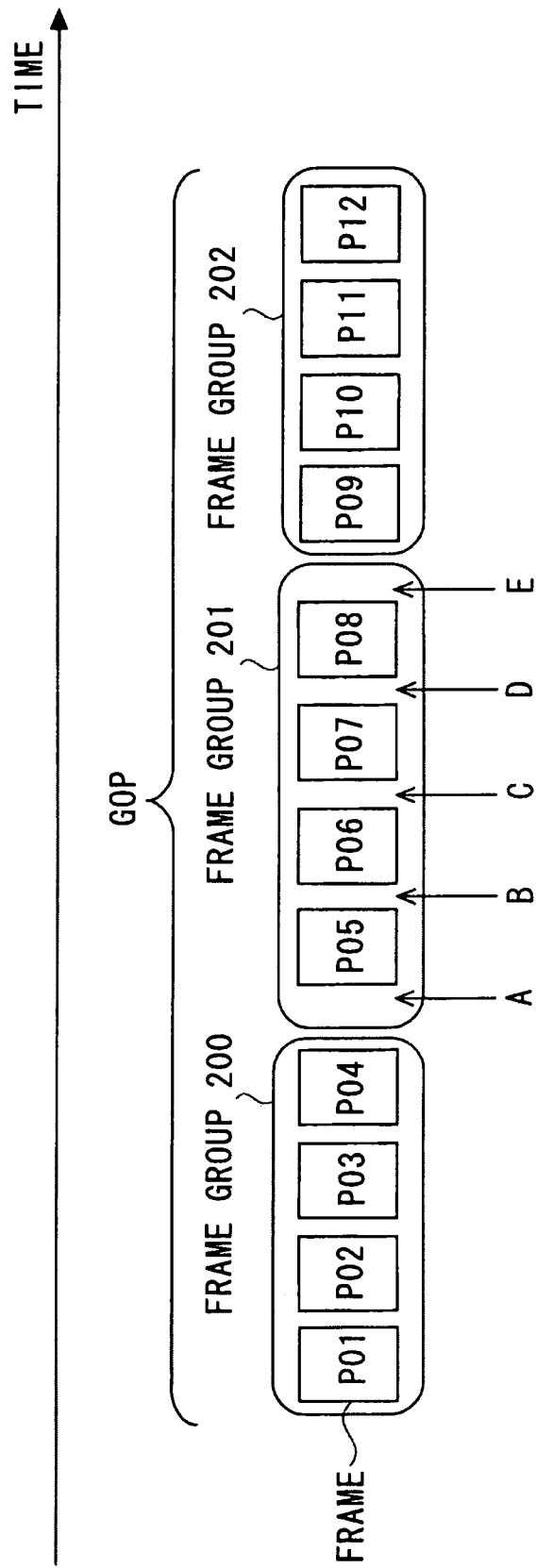
FIG. 10 is an explanatory diagram of the GOP according to the embodiment.

Note that if a new frame has already been inserted in the processing of Step S204, the data creating unit 25 may decide a position in which a new frame is to be inserted by excluding the position in which the new frame has already been inserted. FIG. 10 is an explanatory diagram of the GOP. FIG. 10 illustrates one GOP, in which 12 frames are divided into the frame group 200, the frame group 201, and the frame group 202. For example, if the position in which a new frame is to be added to the frame group 200 of FIG. 10 is a position A of FIG. 10, the position A of FIG. 10 may be excluded as the position in which a new frame is to be added to the frame group 201 of FIG. 10. Note that positions B, C, D, and E of FIG. 10 indicate positions in which a new frame can be added.

Figure 11:
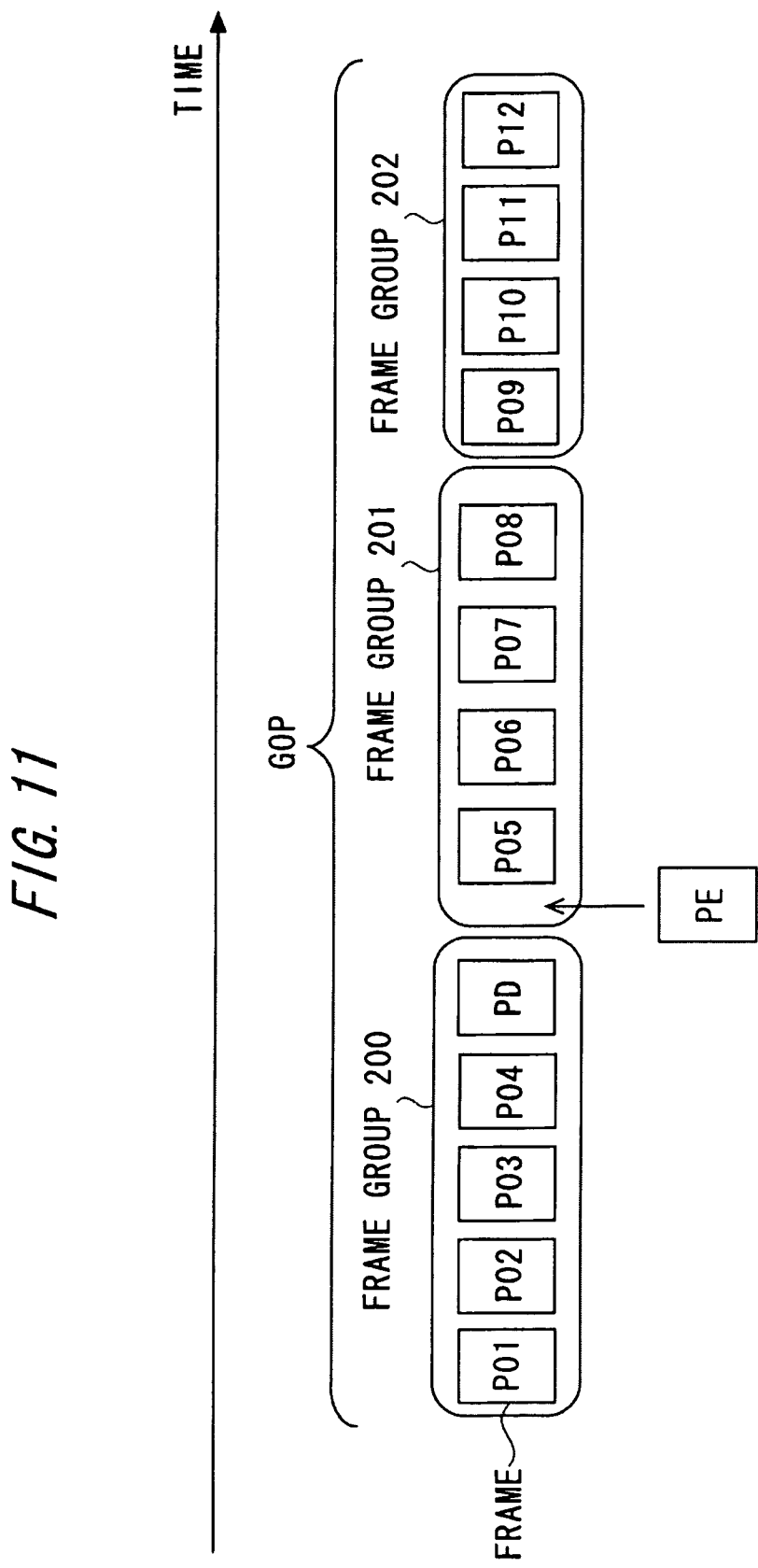
FIG. 11 is an explanatory diagram of the GOP according to the embodiment.

In addition, for example, if the position in which a new frame is added to the frame group 200 of FIG. 10 is the position A of FIG. 10, when a new frame is added to the frame group 201 of FIG. 10, reference may be made to the new frame added to the frame group 200. FIG. 11 illustrates an explanatory diagram of the GOP in a case where a new frame PD is added to the frame group 200. In this case, when a new frame is added to the frame group 201 of FIG. 11, reference may be made to the new frame PD, the frame P05, the frame P06, the frame P07, the frame P08, and the frame P09. With such a configuration, it is also possible to insert a new frame PE between the new frame PD and the frame P05. The data creating unit 25 may store the newly-created frame PD in the storage unit 24 and reference the new frame PD in a case of creating the new frame PE.

Figure 12:
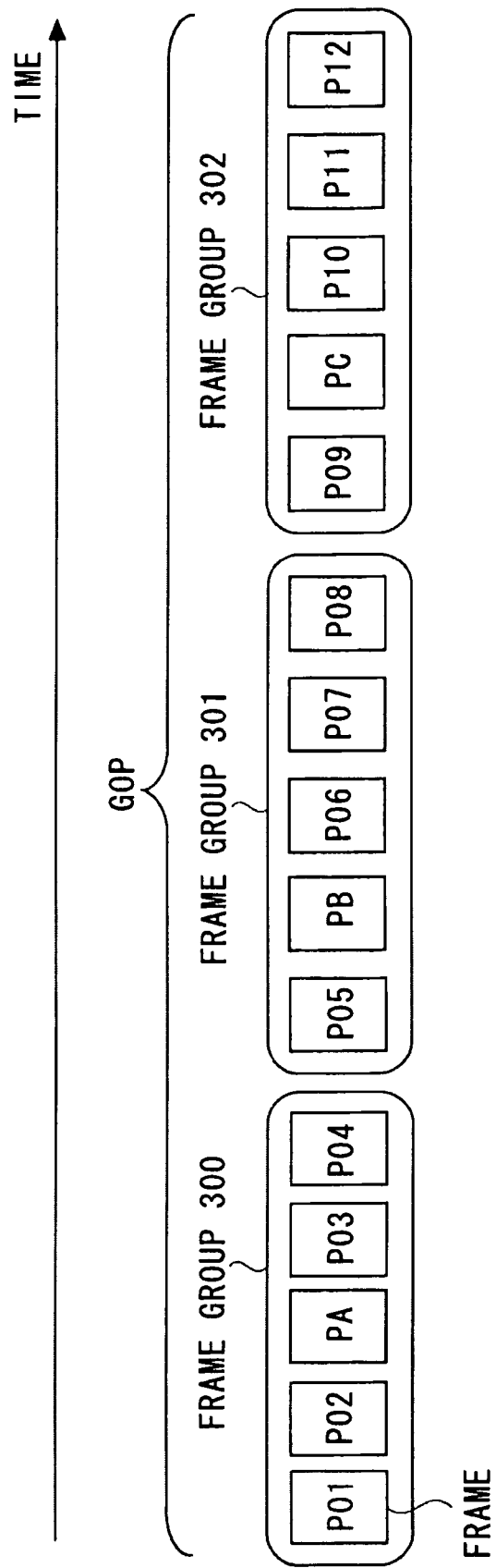
FIG. 12 is an explanatory diagram of the GOP according to the embodiment.

FIG. 12 is an explanatory diagram of the GOP in a case where new frames are added to convert the number of frames included in the GOP from 12 frames to 15 frames. A new frame PA is added to the frame group 300, the new frame PB is added to the frame group 301, and the new frame PC is added to the frame group 302. Accordingly, in the embodiment, new frames are added, the TS data in which the number of frames included in the GOP is changed to 15 frames is output, and the video is displayed based on the 15-frame video signal.

According to the embodiment, when the video data having a small number of frames is received, by adding frames, it becomes possible to display such a video as to prevent the viewer from feeling uncomfortable.

Here, description is made of a case of creating a new frame by referencing both 2 frames exhibiting the largest movement amount of the target block. In bi-directional prediction processing of H.264/AVC, in a case of adding a new frame, 2 frames sandwiching the new frame to be added are referenced to create the new frame. Then, the new frame is inserted between the referenced 2 frames. However, the frame to be referenced may be missing, which may inhibit the new frame to be created with accuracy. This occurs in a case where, when the 12-frame GOP is received, 3 frames are missing and the missing 3 frames are continuous frames.

Figure 13:
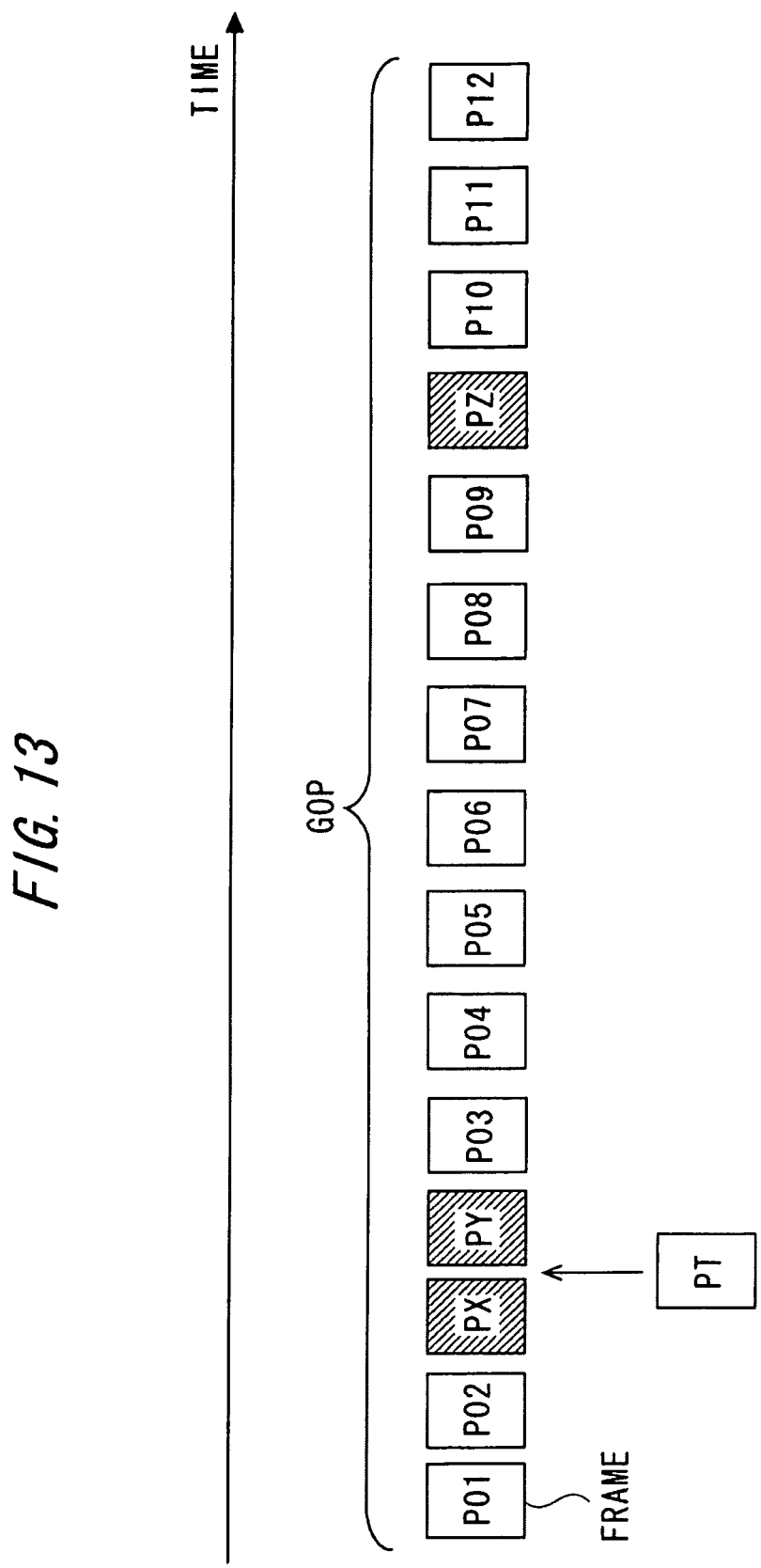
FIG. 13 is an explanatory diagram of bi-directional prediction of H.264/AVC.

FIG. 13 is an explanatory diagram of frames to be referenced by the bi-directional prediction processing of H.264/

AVC. FIG. 13 illustrates a case where the GOP of a source video has 15 frames but the GOP of the received TS data has 12 frames. The frames from the frame P01 to the frame P12 represent frames included in the GOP of the received TS data, and a frame PX, a frame PY, and a frame PZ represent missing frames from the GOP of the source video.

As illustrated in FIG. 13, the frame PX and the frame PY represent continuous frames within the GOP of the source video. A frame PT represents a frame newly created by the bi-directional prediction processing. In a case where the new frame PT is created by the bi-directional prediction processing, frames to be referenced are the frame P02 and the frame PY or the frame PX and the frame P03. However, the frame PY is missing, and hence the new frame PT cannot be created by referencing the frame P02 and the frame PY. Further, the frame PX is missing, and hence the new frame PT cannot be created by referencing the frame PX and the frame P03.

That is, if there are continuous frames that are missing within the GOP of the received TS data, the movement amount of the target block between frames (in FIG. 13, the frame P02 and the frame P03) adjacent to the continuous frames that are missing is too large to estimate the position of the target block within the new frame by the bi-directional prediction processing.

In the embodiment, the new frame is created by referencing one of the 2 frames exhibiting the largest movement amount of the target block and the frame different from the 2 frames exhibiting the largest movement amount of the target block. The different frame is a frame adjacent to one of the 2 frames exhibiting the largest movement amount of the target block.

Therefore, according to the embodiment, even if the movement amount of the target block is too large, that is, if the movement amount of the target block exceeds an allowable amount that can be referenced by the bi-directional prediction processing, it is possible to estimate the position of the target block within the new frame. For that reason, even if the movement amount of the target block is too large, it is possible to create the new frame.

Further, in the embodiment, the new frame is created by referencing not both but one of the 2 frames exhibiting the largest movement amount of the target block. Accordingly, according to the embodiment, it is possible to create the new frame even if continuous frames are missing.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A signal output device, comprising:
    a signal output unit to output a video signal based on input image data;
    a storage unit to store the image data;
    a detection unit to detect whether or not the number of frames included in one set of image data stored in the storage unit satisfies a predetermined number, wherein the one set of image data is a group of pictures (GOP) separated by IDR; and
    a data creating unit to divide, when the number of the frames included in the one set of image data does not satisfy the predetermined number, the frames included in the one set of image data into a plurality of groups, to divide each of the frames into a plurality of local regions, to decide the local region exhibiting the largest movement amount among the plurality of local regions for each of the groups, to detect 2 frames exhibiting the largest movement amount of the decided local region for each of the groups, and to add a new frame between the 2 frames within each of the groups, and to input, to the signal output unit, the one set of image data to which the new frame has been added.

2. The signal output device according to claim 1, wherein the new frame is created based on one frame of the 2 frames and the frame that is different from the 2 frames and is adjacent to the one frame.

3. The signal output device according to claim 1, wherein the new frame is created based on the movement amount and a movement direction between the local region within one frame of the 2 frames and the local region within the frame that is different from the 2 frames and is adjacent to the one frame.

4. The signal output device according to claim 1, wherein:
    the image data comprises a moving image; and
    the frame included in the one set of image data is set as a minimum unit structure that forms the moving image.

5. A signal output method of causing a computer to execute:
    detecting whether or not the number of frames included in one set of image data stored in a storage unit that stores the image data satisfies a predetermined number, wherein the one set of image data is a group of pictures (GOP) separated by IDR;
    dividing, when the number of the frames included in the one set of image data does not satisfy the predetermined number, the frames included in the one set of image data into a plurality of groups;
    dividing each of the frames into a plurality of local regions;
    deciding the local region exhibiting the largest movement amount among the plurality of local regions for each of the groups;
    detecting 2 frames exhibiting the largest movement amount of the decided local region for each of the groups;
    adding a new frame between the 2 frames within each of the groups; and
    outputting the video signal based on the one set of image data to which the new frame has been added.

6. The signal output method according to claim 5, wherein the new frame is created based on one frame of the 2 frames and the frame that is different from the 2 frames and is adjacent to the one frame.

7. The signal output method according to claim 5, wherein the new frame is created based on the movement amount and a movement direction between the local region within one frame of the 2 frames and the local region within the frame that is different from the 2 frames and is adjacent to the one frame.

8. The signal output method according claim 5, wherein:
the image data comprises a moving image; and
the frame included in the one set of image data is set as a minimum unit structure that forms the moving image.

9. A non-transitory computer readable storage medium storing a signal output program for causing a computer to execute:
detecting whether or not the number of frames included in one set of image data stored in a storage unit that stores the image data satisfies a predetermined number, wherein the one set of image data is a group of pictures (GOP) separated by IDR;
dividing, when the number of the frames included in the one set of image data does not satisfy the predetermined number, the frames included in the one set of image data into a plurality of groups;
dividing each of the frames into a plurality of local regions;
deciding the local region exhibiting the largest movement amount among the plurality of local regions for each of the groups;
detecting 2 frames exhibiting the largest movement amount of the decided local region for each of the groups;
adding a new frame between the 2 frames within each of the groups; and
outputting the video signal based on the one set of image data to which the new frame has been added.

10. The non-transitory computer readable storage medium storing the signal output program according to claim 9, wherein the new frame is created based on one frame of the 2 frames and the frame that is different from the 2 frames and is adjacent to the one frame.

11. The non-transitory computer readable storage medium storing the signal output program according to claim 9, wherein the new frame is created based on the movement amount and a movement direction between the local region within one frame of the 2 frames and the local region within the frame that is different from the 2 frames and is adjacent to the one frame.

12. The non-transitory computer readable storage medium storing the signal output program according to claim 9, wherein:
the image data comprises a moving image; and
the frame included in the one set of image data is set as a minimum unit structure that forms the moving image.

* * * * *

UNITED STATES PATENT AND TRADEMARK OFFICE
CERTIFICATE OF CORRECTION

PATENT NO.         : 8,704,954 B2  
APPLICATION NO.    : 12/659119  
DATED              : April 22, 2014  
INVENTOR(S)        : Toshiro Ohbitsu Page 1 of 1

It is certified that error appears in the above-identified patent and that said Letters Patent is hereby corrected as shown below:

In the Claims,

Column 13, Line 7, Claim 8, after "according" insert -- to --.

Signed and Sealed this
Fourth Day of November, 2014

Michelle K. Lee
*Deputy Director of the United States Patent and Trademark Office*